June 5, 1923.
J. H. REISLER
1,457,395
TRACTION DEVICE
Filed July 28, 1922
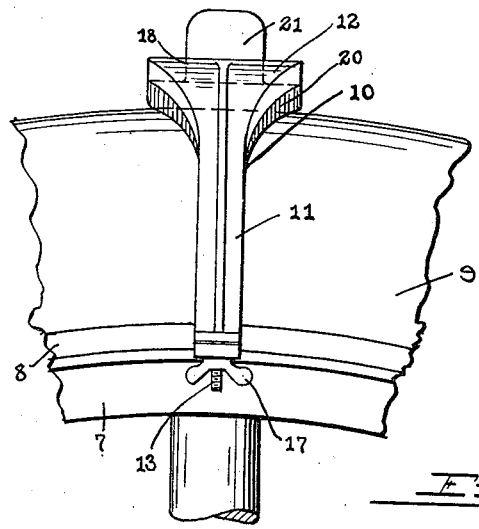
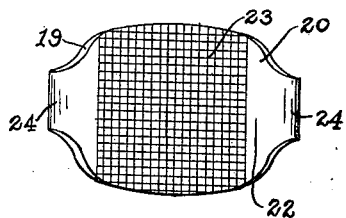
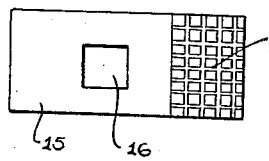
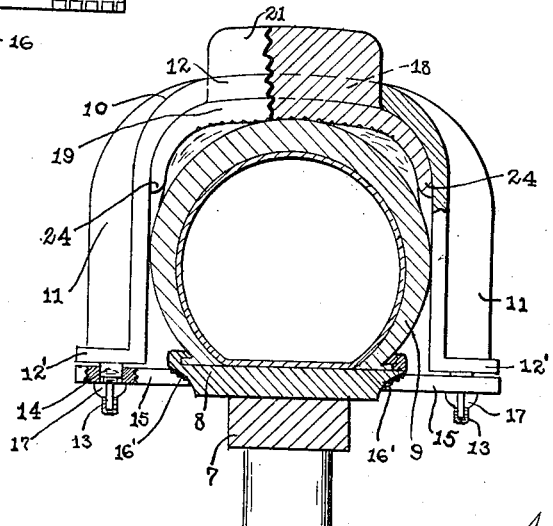
INVENTOR.
Joseph H. Reisler
BY
Morsell & Keeney
ATTORNEYS.

Patented June 5, 1923.

1,457,395

UNITED STATES PATENT OFFICE.

JOSEPH H. REISLER, OF MILWAUKEE, WISCONSIN.

TRACTION DEVICE.

Application filed July 28, 1922. Serial No. 578,201.

*To all whom it may concern:*

Be it known that I, JOSEPH H. REISLER, a citizen of the United States, and resident of Milwaukee, in the county of Milwaukee and State of Wisconsin, have invented new and useful Improvements in Traction Devices, of which the following is a description, reference being had to the accompanying drawings, which are a part of this specification.

This invention relates to improvements in traction devices adapted for use for power driven vehicle wheels.

It is one of the objects of the present invention to provide a traction device which may be easily and quickly mounted upon an automobile wheel without the necessity of in any way altering or cutting the wheel or tire.

A further object of the invention is to provide a traction device which may be mounted on or removed from the wheel in a very simple manner without the use of tools of any kind and in whatever position the wheel may happen to be.

A further object of the invention is to provide a traction device for use when the vehicle is passing thru mud, snow, ice or sand and to in general increase the tractive power of the vehicle.

A further object of the invention is to provide a traction device which can be easily and positively locked upon the rim of the vehicle and will in no way injure or mar the tire, rim or wheel.

A further object of the invention is to provide a traction device which is of simple construction, is strong and durable and is well adapted for the purposes described.

With the above and other objects in view, the invention consists of the improved traction device and its parts and combinations as set forth in the claims and all equivalents thereof.

In the accompanying drawings, in which the same reference characters indicate the same parts in all of the views;

Fig. 1 is a side view of a portion of a vehicle wheel showing the improved traction device mounted thereon;

Fig. 2 is a front view thereof, parts being shown in section and parts broken away;

Fig. 3 is a plan view of one of the rim locking members; and

Fig. 4 is an inner face view of the tire engaging member.

Referring to the drawing, the numeral 7 indicates a portion of the felly of an automobile, 8 the tire rim secured thereto and 9 a tire mounted on the rim.

The numeral 10 designates a U-shaped member or yoke preferably of metal having arms 11 and a wider mid portion 12 which joins the arms 11. The inner faces of arms 11 are smooth and adapted to rest against the sides of tire 9, while the extremities of said arms are flanged outwardly as at 12' and have projecting from their faces, threaded extensions 13 which are formed with shoulders 14. A pair of rim locking members or lugs 15 are further provided and have squared openings 16 so as to allow said members 15 to receive therein said extensions 13 and snugly engage said shoulders 14. Said rim locking members 15 are rectangular in shape and are of such a length as to permit their innermost ends, which are beveled, and corrugated, as at 16, to bear firmly against the outermost edges of tire rim 8. Winged nuts 17 are further provided to adjustably and removably hold members 15 to member 10 and the rim 8, and in that manner providing means for removably locking yoke 10 to the rim.

The wider mid portion 12 of the U-shaped member or yoke 10 is provided with a central oval opening 18 which is adapted to removably receive the tire engaging member 19. Said tire engaging member is formed of hard rubber so as to in no way injure the tire against which it rests and has a wide base portion 20 exactly coinciding in size and shape with mid portion 12. Projecting from one face of the tire engaging member 18 is a knob or lobe 21 of such proportions as to permit its snug reception in opening 18 and its projection from the outermost face of mid portion 12 of about an inch. The innermost face 22 of member 19 has a slight curvature so as to allow it to follow the contour of yoke 10 and tire 9 and has corrugations 23 to prevent any slipping where said tire 9 and inner face 22 come in contact with each other. Ears 24 are formed at the ends of tire engaging member 19 and rest against the inner faces of arms 11.

From the above description it will be apparent that the improved traction device is readily and quickly attachable or detachable.

To attach the device, the winged nuts 17 and lugs 15 are merely removed from the threaded extensions and tire engaging member 19 is secured in place thru opening 18. Yoke 10 is then pushed onto the tire until the tire meets face 22 and the lugs 15 are then inserted and secured against rim 8 by the adjustment of winged nuts 17. Thus, the traction device is locked in place.

It, of course, is understood, that the device may be made in any size so as to fit all standard sizes of tire and that one or any number of the devices may be used on a vehicle wheel.

From the above description, it will be seen that the improved traction device is of very simple construction, and is well adapted for the purposes described.

What I claim as my invention is:

1. A traction device for vehicles, comprising a U-shaped yoke member having a widened mid-portion and an opening therein, a lobed tread member mounted in said yoke member with its lobe portion projecting outwardly through the opening, and clamping means for securing said yoke member to a vehicle rim and for drawing said tread member into firm engagement with the yoke member and vehicle tire.

2. A traction device for vehicles, comprising a U-shaped yoke member to engage a narrow area of a vehicle tire and having a widened mid-portion with an opening therein, a hard rubber lobed tread member removably mounted in said yoke member, and clamping means for removably securing said yoke member to a vehicle rim and for drawing said tread member into firm engagement with the yoke member and vehicle tire, said tread member being interposed between the vehicle tire and the mid-portion of the yoke and having the face adjacent the tire formed so as to prevent any slipping therebetween.

In testimony whereof, I affix my signature.

JOSEPH H. REISLER.